Dec. 10, 1968  M. P. AMASON ET AL  3,416,027
RADOME LIGHTNING PROTECTION MEANS
Filed March 10, 1967
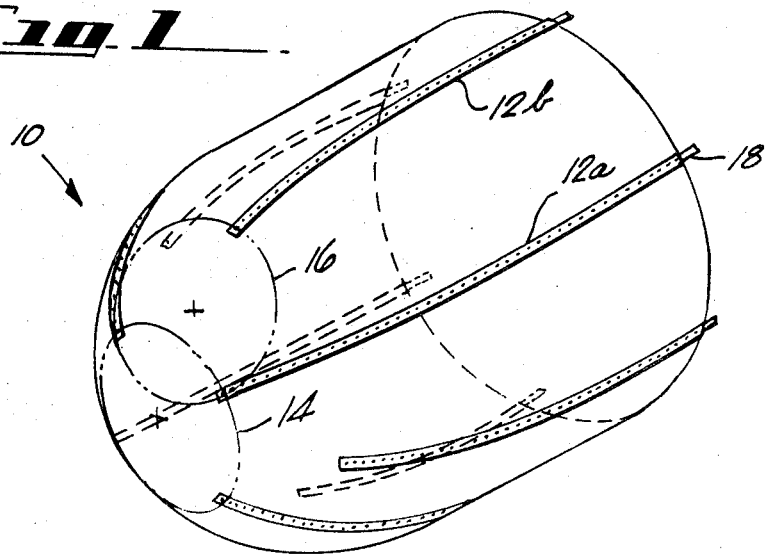
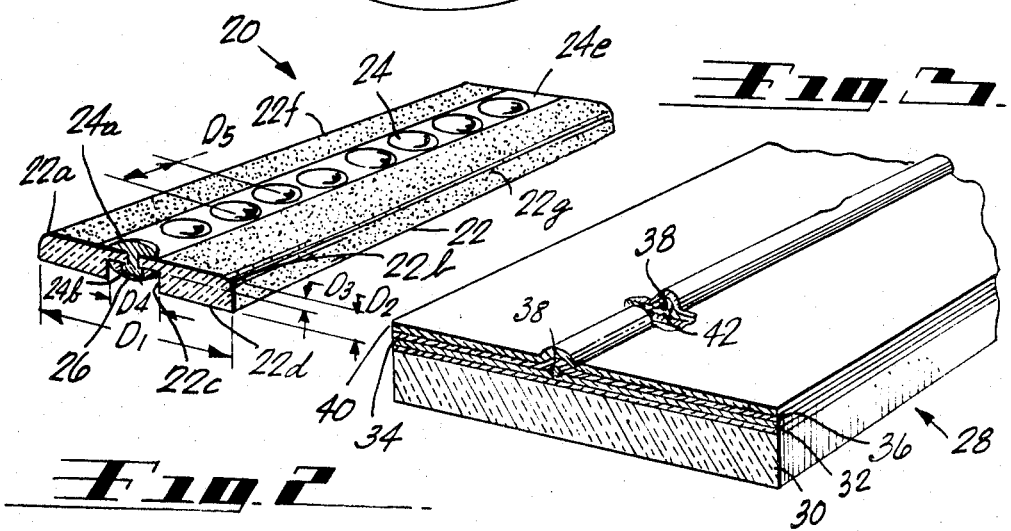
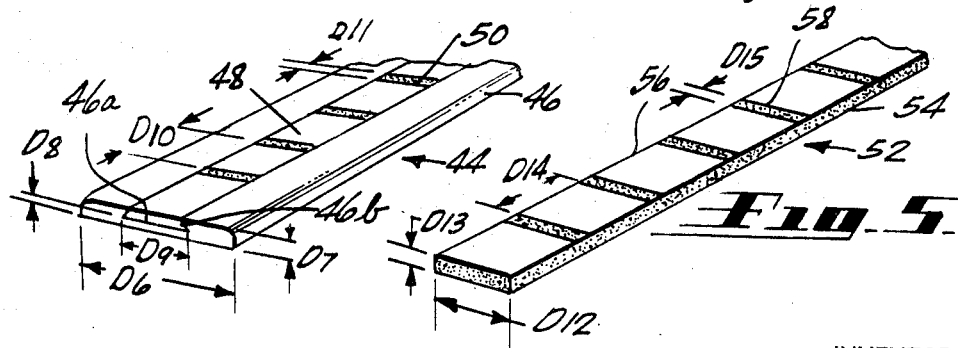
INVENTORS
MYRON P. AMASON
GEORGE J. CASSELL
BY
-AGENT-

United States Patent Office 3,416,027
Patented Dec. 10, 1968

3,416,027
RADOME LIGHTNING PROTECTION MEANS
Myron P. Amason, Reseda, and George J. Cassell, Huntington Beach, Calif., assignors, by mesne assignments, to McDonnell Douglas Corporation, Santa Monica, Calif., a corporation of Maryland
Filed Mar. 10, 1967, Ser. No. 622,141
12 Claims. (Cl. 315—36)

ABSTRACT OF THE DISCLOSURE

A number of lightning protection strip assemblies are installed in a selected configuration on a radome for protection thereof from lightning strokes. Each strip assembly includes a series of spaced metallic segments connected by appropriate resistance material. The metallic segments have a maximum dimension less than approximately 1/8 of a wave length of the highest operating frequency of the antennas located within or adjacent to the radome, and the connecting material has a strip resistance above approximately 80,000 ohms per foot. Such strip assemblies produce a radar transparent, radome lightning protection system which can withstand repeated lightning strikes thereon.

Background of the invention

Our present invention pertains to the field of lightning protection systems and more particularly to lightning protection means for radomes and the like.

A previously devised lightning protection system which is widely used on aircraft radomes comprises a series of continuous, metallic foil strips adhesively fastened to the exterior surface of a radome and grounded at the ends near the base of the radome. When a foil strip is first contacted by a main stroke of lightning, the strip will disintegrate along the path of contact, and will be exploded away from the radome to provide an ionized trail over the radome surface. It is this ionization trail which conducts the subsequent, relatively long discharge of the main stroke of lightning over the surface of the radome. Such a lightning protection system is shown, described and claimed in the reissue Patent No. Re. 25,417 of Myron P. Amason, reissued on July 16, 1963, and entitled, Lightning Arrestor for Radomes.

The continuous, metallic foil strips used in the lightning protection system described above re-radiate when inserted in the field of a radar antenna, causing an increase in side lobe level of the antenna radiation pattern, a loss in radar range and significant pattern distortion. Although this degradation in antenna pattern is within acceptable limits for many antennas, it is desirable to provide a radome lightning protection system of very low degradation effect and which is acceptable for use with any antenna.

Further, while the lightning protection system utilizing the continuous metallic foil strips provide adequate lightning protection for radomes against a single stroke of lightning thereon, it is obviously unsuitable where repeated stroke protection is required without having to replace after each stroke the strips vaporized by lightning. Accordingly, it is also desirable to provide a lightning protection system which is always capable of sustaining and transferring the energy of repeated strikes of lightning thereon.

Summary of the invention

Briefly, and in general terms, our invention broadly comprises a lightning protection strip assembly which includes a series of spaced metallic or conductive segments connected by appropriate resistance material. A number of these strip assemblies are used to protect a radome by installing the strip assemblies on the radome in an appropriate configuration. The installed strip assemblies are radar transparent and can withstand repeated strikes of lightning thereon while giving proper and adequate protection of the radome on which the strip assemblies are mounted. This is accomplished by providing strip assemblies having metallic or conductive segments of a maximum dimension which is less than approximately 1/8 of a wave length of the highest operating frequency of the antenna, or antennas, housed within the radome, and by providing material having a strip resistance above approximately 80,00 ohms per foot connecting the metallic segments in each strip assembly.

The spaced metallic segments can, of course, be larger than 1/8 of a wavelength of the highest operating antenna frequency but this would cause a commensurately higher degree of antenna pattern degradation. Similarly, connecting materials with resistances less than 80,000 ohms per foot of strip length can be used for certain applications. However, the lower resistances may cause the transferred lightning discharge energy to remain almost entirely in the resistance material and result in an explosion which destroys the strip assembly. Too low a resistance will, of course, also short or connect the metallic segments together and form a substantially continuous conductive strip which re-radiates in the antenna field to produce the subsequent, undesirable, antenna radiation pattern distortion.

Brief description of the drawing

Our invention will be more fully understood, and other advantages and features of the invention will become apparent from the following detailed description of certain preferred embodiments of the invention. The detailed description is to be taken in conjunction with the accompanying drawing, in which:

FIGURE 1 is a perspective view of an aircraft nose radome having lightning protection strip assemblies in accordance with this invention installed thereon;

FIGURE 2 is a fragmentary perspective view of a first illustrative embodiment of the invention;

FIGURE 3 is a fragmentary perspective view of a second illustrative embodiment thereof;

FIGURE 4 is another fragmentary perspective view of a third illustrative embodiment thereof; and FIGURE 5 is another fragmentary perspective view of a fourth illustrative embodiment thereof.

Detailed description of the preferred embodiments

FIGURE 1 shows a radome 10 which forms, for example, the forward part of the nose of an airplane (not shown). Lightning protection means according to our invention and including strip assemblies 12a and 12b are installed on the radome 10 in an arrangement or configuration as illustrated in FIGURE 1. The strip assemblies 12a and 12b are preferably bonded to the outer surface of the radome 10 longitudinally thereon and are spaced circumferentially about it. The strip assemblies can, of course, be structurally bolted to the radome 10. However, such attachments should be limited to a minimum of places on the radome 10 since the drill holes required to accommodate the attachments must be carefully and completely sealed after installation. The longer strip assemblies 12a terminate at their forward ends approximately on the periphery of a circle 14. The shorter strip assemblies 12b terminate at their forward ends approximately on the peripheries of respective circles, such as circle 16, which each pass through the forward ends of a corresponding shorter strip assembly 12b and its two adjacent longer strip assemblies 12a. The arrangement or configuration of strip assemblies 12a and 12b on the radome 10 is generally designed to provide full protection for a nose radome of an airplane with minimum drag or resistance to air and rain flow thereover.

The aft ends of the strip assemblies 12a and 12b are grounded at the base of the radome 10 to aircraft structure by connecting straps 18 or any other suitable connection means such as hinges, shear pins, or attach bolts. A radome area within a radius of, for example, approximately 9 or 10 inches from any point on one of the resistively conductive strip assemblies 12a or 12b will be adequately protected from a stroke of lightning since the stroke will be drawn to the point on the conductive strip assembly rather than through the radome to a point on the antenna thus causing physical damage to the radome and antenna. Accordingly, the radius of the circle 14 should not be greater than approximately 9 or 10 inches in order that the radome area within the circle 14 will be adequately protected. Similarly, the radius of the circle 16 should not exceed approximately 9 or 10 inches for the same reason. Other arrangements or configurations of resistively conductive strip assemblies similar to strip assemblies 12a and 12b can, of course, be provided on radomes of various shapes and sizes.

FIGURE 2 shows one illustrative embodiment of the lightning protection means according to this invention. A lightning protection strip assembly 20 includes a generally rectangular strip 22, and a series of metallic segments in the form of conductive buttons 24 affixed thereto and connected by resistance material 26. The strip 22 has rounded upper corners 22a and 22b, and a central lower channel 22c which extends the length of the strip 22. The channel 22c in this example has a rectangular cross section which is open along the lower face 22d of the strip 22. The buttons 24 can be rivets, for example, which are centrally riveted to the strip 22 such that the heads 24a are secured against the upper face 22e and spaced uniformly along the length of the strip 22. The lower ends 24b of the rivets or buttons 24 are compressively deformed within channel 22c to fasten the rivets 24 to the strip 22. The resistance material 26 is formed by brushing the material in liquid condition over the lower ends 24b of the rivets 24 to cover and connect the lower ends 24b fully in the channel 22c. The number of coats applied determines the resistance of the material 26. The upper side surfaces 22f and 22g along the strip 22 are preferably coated with neoprene to provide rain erosion protection therefor where required.

The resistance material 26 assists in the initiation and establishment of an ionization channel or path adjacent to the strip assembly 20 during a lightning strike when the strip assembly 20 is installed on a radome. The resistance material 26 also helps prevent corona discharge and sparking between the metallic segments or conductive buttons 24 during electrostatic and tribolectric charging (transfer of charge by particle impingement) of the spaced metallic segments. This, of course, prevents the invention from generating radio frequency noise which interferes with communication systems aboard the aircraft mounting the radome. In order to accomplish the foregoing functions, the resistance material 26 must have a sufficiently high strip resistance but obviously not so high as to approach that of an insulating material which would effectively separate electrically the metallic segments or conductive buttons 24.

The resistance material 26 is selected from appropriate materials by considering (1) the basic environmental characteristics of the material, (2) the electrical resistance or resistivity of the material, (3) the shape, size and spacing of the metallic segments used and (4) the overall length of the lightning protection strip assemblies.

In connection with the environmental characteristics of the resistance material, the selected material must, of course, perform satisfactorily where applicable in regards to its structural, thermal, electrical and weathering (rain durability, for example) properties in an operating aircraft's environment. It is desirable for the resistance material to have an electrical resistance or lineal resistivity above approximately 80,000 ohms per foot of strip length in order to initiate and establish an external ionization channel or path adjacent to a strip assembly during a lightning strike. As mentioned previously, lower resistances may result in an explosion or vaporization of the resistance material and thus destroy the strip assembly. If the resistance material has too low a resistance, re-radiation occurs when the strip assembly is located in the field of an antenna and causes undesirable distortion of the antenna radiation pattern.

The size and shape of the metallic segments in a strip assembly are physically limited essentially by the type of material used, and primarily limited by its permissible electrical size in terms of wave length. For radar transparent, radome lightning protection strip assemblies, the maximum dimension of the metallic segments should be less than approximately ⅛ wave length at the highest antenna operating frequency. The spacing between the metallic segments should be great enough to prevent sparking during maximum p-static (precipiation-static) charging rates and close enough together to establish ionization or arcing between segments during lightning strikes. Such spacing is, of course, also a function of the resistance material used to connect the metallic segments as discussed above.

Where long lightning protection strip assemblies are required, it is desirable to have various sections of the strip assemblies fabricated using respective resistance materials of different resistances. The section of the lightning protection strip assembly farthest from ground should, in most cases, have the righest resistance. The purpose of this is to develop a reasonably high voltage across a relatively small outer section rather than over the total length of the strip assembly and thus aid in the initiation of an external ionization channel or path in which arcing takes place during a lightning strike.

A lightning protection strip assembly 20 which can be used with antennas operating at or below approximately 10 gHz. (10 gigahertz or 10 kilomegacycles per second) can have the strip 22 fabricated from Fiberglas laminate material, the conductive buttons 24 can be MS20470A3 rivets, the resistance material 26 can be formed of type R–15SD resistive coating which is available from Electro Science Company of Philadelphia, Pennsylvania, and the side surfaces 22f and 22g can be coated with MIL–C–7439, Class 1, neoprene. Labeled illustrative dimensions indicated in FIGURE 2 includes D1=0.750, D2=0.100, D3=0.040, D4=0.200 and D5=0.208 (typical) inch.

It should be clearly understood, of course, that the particular types of materials and specific dimensions listed above are provided for illustrative purposes only, and are not intended to limit the scope of our invention in any manner. This is also true for any of the various types of materials and specific dimensions subsequently given.

The resistance material 26 covering and connecting the lower ends 24b of the rivets or buttons 24 has a selected strip resistance or lineal resistivity which is normally constant in ohms per foot of strip length. However, the resistance material 26 can be made to vary in resistance along the length of the strip 22. For example, the resistance of the material can be progressively reduced with distance from the forward end of one of the strip assemblies 12a and 12b in FIGURE 1 towards the aft end at the base of the radome 10. This progressive reduction in resistance or resistivity with distance from the forward end of a strip assembly can be varied in a continuous manner or in discrete increments. The electrical protection strip assemblies 12a and 12b are preferably made variable in resistance or resistivity with distance where the lengths of the strip assemblies are relatively long; e.g., approximately 8 or 9 feet and over.

It is, of course, simpler and more economical to fabricate the strip assemblies 12a and 12b with resistance material which varies in resistance in discrete increments rather than in a continuous manner. In fact, separate strips such as strip 22 having resistance material 26 of constant resistance can be used to form a strip assembly by electrically connecting contiguous ends of adjacent strips together. In a strip assembly which is, for example, 12 feet long, three major sections each 4 feet long and having resistance material 26 of respectively constant resistances can be used. The resistances of the sections preferably differ progressively in powers of 10. Thus, the forward section of the exemplary strip assembly can have a resistance material 26 having a strip resistance of 8 megohms per foot, that of the intermediate section can have a resistance of 800 kilohms per foot and that of the aft section can have a resistance of 80,000 ohms per foot.

FIGURE 3 shows another embodiment of this invention. A lightning protection strip assembly 28 includes a lower base strip 30, a thin layer 32 of non-conductive neoprene thereon, followed by a resistively conductive layer 34 of neoprene, which embeds therein a series of spaced metallic wire segments 38, then by another resistively conductive layer 36 of neoprene and finally by a top cover layer 40 of non-conductive neoprene. Small gaps 42 are produced between the wire segments 38 during the process of fabricating the strip assembly 28. The base strip 30 can be, in certain instances, part of a radome itself.

The strip assembly 28 is illustratively fabricated by utilizing a Fiberglas laminate base strip 30 of appropriate length and applying thereon a layer 32 of Class 1 neoprene followed by a layer 34 of Class 2 neoprene. While this layer 34 is still tacky, copper wire segments 38 approximately ⅛ wave length long are pressed into the tacky layer 34 end to end centrally down the length of the strip 30. Another layer 36 of Class 2 neoprene is then applied over the layer 34 and the embedded wire segments 38. A top cover layer 40 of Class 1 neoprene is then applied over the layer 36. The ends of the wire segments 38 are separated by small gaps 42 so that the segments 38 are only connected by the resistively conductive layers 34 and 36.

A radome transparent, lightning protection strip assembly 28 which is suitable for use with antennas operating at or below approximately 10 gHz. can be fabricated, for example, with Fiberglass laminate 1/16 x ¾ inch stock for the base strip 30, Class 1 neoprene 0.010 inch thick for the layers 32 and 40, Class 2 neoprene 0.010 inch thick for the layers 34 and 36, and No. 26 copper wire for metallic segments 38 which are 0.150 inch long with gaps 42 of approximately 0.020 inch therebetween.

FIGURE 4 illustrates another embodiment of a strip assembly 44 which includes a base strip 46 having a channel 46a with inwardly beveled sides 46b to accommodate and retain metallic plate segments 48 that are spaced from each other by separating resistance material 50. The channel 46a is open and extends centrally along the upper face of the base strip 46. The plate segments 48 have beveled sides which complement the beveled sides 46b of the channel 46a. The beveled sides of the channel 46a and of the plate segments 48 are inclined inwardly toward the center of the strip 46 at angles of, for example, 60 degrees from vertical.

As in the previous examples, a radome transparent, lightning protection strip assembly 44 which is suitable for use with antennas operating at or below approximately 10 gHz. can be fabricated, for example, with Fiberglas laminate material for the base strip 46, 0.032 inch thickness sheet aluminum for the plate segments 48 and type R-14 resistive coating for the resistance material 50. Labeled illustrative dimensions indicated in FIGURE 4 include $D6=0.750$, $D7=0.100$, $D8=0.060$, $D9=0.250$, $D10=0.150$ and $D11=0.020$ (typical) inch.

FIGURE 5 shows another exemplary embodiment of a strip assembly 52 which includes base strip 54, metallic sprayed segments 56 and protective coatings 58 provided between the sprayed segments 56 and, if desired, on the sides of the base strip 54. The base strip 54, in this example, is a generally rectangular cross section strip of suitable length and made of appropriate resistance material. The sprayed segments 56 are obtained by providing a layer of spray metal less than approximately 0.003 inch thick on the base strip 54 on longitudinally spaced rectangular areas on the upper surface thereof.

The base strip 54 is illustratively a type 2 resistance strip manufactured and sold by International Resistance Company of Philadelphia, Pennsylvania. The sprayed segments 56 can be formed from type E-Kote 40 spray metal which is available from Epoxy Products, Inc. of Irvington, N.J. The coatings 58 can be Class 1 neoprene, for example, applied on the upper surface of the base strip 54 between the sprayed segments 56 to provide rain erosion protection for such areas where desired. These coatings 58 can be approximately 0.010 inch thick.

A satisfactory radome transparent, lightning protection strip assembly 52 which is suitable for use with antennas operating at or below approximately 10 gHz. can have dimensions as labeled in FIGURE 5 wherein $D12=0.250$, $D13=0.027$, $D14=0.150$ and $D15=0.020$ (typical) inch. As is the case with the other lightning protection strip assemblies, the strip assembly 52 is preferably bonded onto a radome surface in an appropriate configuration, rather than being structurally bolted thereto.

Although our lightning protection means is intended to be used primarily on aircraft radomes, it can be obviously adapted for use on ground radomes, shipboard radomes, and other structures. The strip assemblies can also be curved or otherwise shaped or molded, and it is to be understood that the particular embodiments of our invention described above and shown in the drawing are merely illustrative of, and not restrictive on, the broad invention and that various changes in design, structure and arrangement may be made without departing from the spirit and scope of the appended claims.

We claim:
1. Lightning protection means comprising:
   a series of spaced conductive segments having at least a portion of each of said segments located closely to a potential lightning producing environment; and
   resistance material connecting said segments in series, the spacing of said segments and the resistance of said material being selected to prevent corona discharge and sparking between said segments during any electrostatic and triboelectric charging thereof and to initiate and establish ionization between said segments during one and more lightning strikes thereon, whereby generation of radio frequency noise through any electrostatic and triboelectric charging is prevented and travel in and damage to said material by a main, high current, portion of each lightning strike are prevented, respectively.

2. The invention as defined in claim 1 wherein said segments have a maximum dimension less than approximately ⅛ of a wave length of the highest operating frequency of an associated antenna, and said resistance material has a resistance above approximately 80,000 ohms per foot and below approximately 800 megohms per foot of length in a direction generally along said segments connected resistively in series.

3. The invention as defined in claim 1 wherein said segments include metallic buttons.

4. The invention as defined in claim 1 wherein said segments include lengths of metallic wire.

5. The invention as defined in claim 1 wherein said segments include metallic plates.

6. The invention as defined in claim 1 wherein said segments include spray metal portions.

7. Lightning protection means comprising:
   a series of spaced conductive segments; and
   resistance material connecting said segments in series, said resistance material being variable in resistance with distance in a direction generally along said segments connected resistively in series.

8. Lightning protection means comprising:
a nonconductive strip having a lower channel extending along the length thereof;
a series of spaced conductive segments, said segments having a maximum dimension less than approximately ⅛ of a wave length of the highest operating frequency of an associated antenna and including metallic buttons affixed to an upper surface of said strip with lower ends of said buttons positioned within said channel; and
resistance material connecting said segments in series, said resistance material having a resistance above approximately 80,000 ohms per foot and located in said channel covering and connecting the lower ends of said buttons.

9. The invention as defined in claim 7 wherein the resistance of said resistance material varies continuously with distance in a direction generally along said segments connected resistively in series.

10. The invention as defined in claim 7 wherein the resistance of said resistance material varies in discrete increments with distance in a direction generally along said segments connected resistively in series.

11. The invention as defined in claim 1 wherein said segments have a maximum dimension less than approximately ⅛ of a wave length of the highest operating frequency of an associated antenna, and said resistance material has a resistance above approximately 40,000 ohms per foot and below approximately 500 megohms per foot of length in a direction generally along said segments connected resistively in series whereby a small amount of distortion could be produced in the radiation pattern of said associated antenna.

12. The invention as defined in claim 1 further comprising a radome structure for housing said associated antennas and including a plurality of said lightning protection means thereon, said segments each having a selected maximum dimension and spacing therebetween to prevent said segments from re-radiating effectively at the operating frequencies of said associated antennas, and said resistance material having a selected resistance above approximately 10,000 ohms per foot and below approximately 500 megohms per foot to provide radio frequency isolation between said segments and produce arcing across the spacings between said segments during the initial phases of each lightning strike to create an ionized path adjacent thereto for the main, high current, portion of the lightning strike to follow.

References Cited

UNITED STATES PATENTS

| | | | |
|---|---|---|---|
| 958,454 | 5/1910 | Wirt | 313—325 X |
| 2,891,194 | 6/1959 | McStrack | 315—36 |

FOREIGN PATENTS 578,664 7/1946 Great Britain.

JAMES W. LAWRENCE, *Primary Examiner.*

U.S. Cl. X.R.

313—308, 325; 315—59, 189, 324; 317—69, 70

UNITED STATES PATENT OFFICE
CERTIFICATE OF CORRECTION

Patent No. 3,416,027                                       December 10, 1968

Myron P. Amason et al.

It is certified that error appears in the above identified patent and that said Letters Patent are hereby corrected as shown below:

In the drawing, Sheet 1, in FIG. 2, numeral "24e" should read -- 22e --. Column 3, line 5, "randome" should read -- radome --; line 54, "tribolectric" should read -- triboelectric --. Column 4, line 33, "righest" should read -- highest --. Column 6, line 51, "tdiboelectric" should read --triboelectric --. Column 8, line 5, after "housing" cancel "said".

Signed and sealed this 10th day of March 1970.

(SEAL)
Attest:

Edward M. Fletcher, Jr.                           WILLIAM E. SCHUYLER, JR.

Attesting Officer                                           Commissioner of Patents